United States Patent
Wireman et al.

[11] Patent Number: 5,230,281
[45] Date of Patent: Jul. 27, 1993

[54] APPARATUS FOR ROASTING COFFEE BEANS OR THE LIKE

[75] Inventors: Jack Wireman; Daniel R. Wireman, both of Fallbrook, Calif.

[73] Assignee: Blaw Knox Food & Chemical Equipment Co., Buffalo, N.Y.

[21] Appl. No.: 727,899

[22] Filed: Jul. 10, 1991

[51] Int. Cl.⁵ .................... A23N 12/00; A23N 12/08; F26B 17/00; F26B 17/24

[52] U.S. Cl. .................... 99/483; 34/57 E; 34/58; 99/286; 99/484; 432/58

[58] Field of Search ............. 99/483, 357, 352, 355, 99/473, 474, 475, 484, 516, 286; 366/165; 34/58, 57 R, 57 C, 57 B, 57 E, 184, 60; 426/467, 311, 519, 520; 432/58; 406/173

[56] References Cited

U.S. PATENT DOCUMENTS

| | | | |
|---|---|---|---|
| 2,857,683 | 10/1958 | Schytil | 34/57 A |
| 3,207,494 | 9/1965 | Jager | 34/58 |
| 3,964,175 | 6/1976 | Sivetz | 34/57 A |
| 4,089,259 | 5/1978 | Stickle et al. | 99/355 |
| 4,299,563 | 11/1981 | Bryant, II | |
| 4,682,423 | 7/1987 | Gaget | 34/58 |
| 4,785,726 | 11/1988 | Wear et al. | 99/485 |
| 4,860,461 | 8/1989 | Tamaki et al. | 99/286 |
| 4,875,904 | 10/1989 | Munk | 34/62 |
| 4,924,765 | 5/1990 | Pera | 99/470 |
| 4,949,632 | 8/1990 | Porzi | 99/468 |
| 5,068,979 | 12/1991 | Wireman et al. | 99/483 |

FOREIGN PATENT DOCUMENTS

| | | | |
|---|---|---|---|
| 321250 | 10/1983 | Fed. Rep. of Germany | |
| 1449801 | 1/1989 | U.S.S.R. | 34/58 |
| 2162412 | 2/1986 | United Kingdom | 99/286 |

Primary Examiner—Timothy F. Simone
Attorney, Agent, or Firm—Bacon & Thomas

[57] ABSTRACT

An apparatus for roasting coffee beans or the like includes a controlled spinning bed or fluid bed roaster in combination with a cyclone separator for removing chaff from the heating medium. The cyclone separator is disposed above and in coaxial and abutting relationship with the roaster. The separator has a generally cylindrical shape with a plate having a plurality of louvers in the base thereof. The louvers impart rotational movement as the heating medium passes therethrough so that the chaff can be removed therefrom. In a preferred embodiment of the invention, a second centrifugal separator which is relatively small with respect to the first separator is disposed adjacent the first separator for making a final separation and returning the heated medium to the roaster.

13 Claims, 5 Drawing Sheets

APPARATUS FOR ROASTING COFFEE BEANS OR THE LIKE

This invention relates to an apparatus for roasting particulate vegetable material and, more particularly, to an apparatus for roasting coffee beans which includes a generally vertical roasting chamber; means for introducing a flow of heated fluid into the chamber for swirling or levitating the beans by means of the heated fluid and roasting the coffee beans therein; and an axially aligned and abutting centrifugal separator for removing chaff or residue from the heated fluid as the fluid is removed from the apparatus. The invention also relates to an improved cyclone separator for use with a controlled spinning bed roaster or with a fluid bed roaster.

BACKGROUND OF THE INVENTION

In its simplest form, coffee roasting comprises heating a single bean to a prescribed temperature at which point chemical reactions occur that transform the bean into the desired state of pyrolysis. These reactions occur in the last part of the heating cycle. Thus, the residence time at the terminal temperature is crucial because a difference in a few seconds in heat-history can have a significant effect on the taste of the coffee.

The problem is that it is difficult to design a roaster that will roast several hundred pounds of beans at one time and to roast every bean evenly. Whether the process for heat transfer is from convection, conduction, radiation, or some combination thereof, the heat is absorbed in the first few layers of a bean bed. Therefore, it is desirable to establish some means for equalizing bean temperature throughout the heating cycle so that when the final roasting temperatures are approached, all of the beans will be close to the same temperature during the pyrolysis process.

The prior art is replete with attempts to obtain roasting uniformity. For example, various approaches for roasting coffee are set forth in the United States patent of Schytil, U.S. Pat. No. 2,857,683.

In the aforementioned prior art processes, the heating time to reach critical temperatures were considered to be relatively unimportant. For example, prior art processes typically roasted coffee beans for periods of six to twenty minutes. However, in recent years, it has been found that coffee beans expand more and result in lower roast bean density if the heating process is speeded up to where the total heating cycle is accomplished in as short a time period as possible consistent with acceptable product characteristics, preferably within 70-90 seconds. Further, it has been found that these light density beans, when ground, have increased extractable solids and wettability, thus yielding an increase in extractable solids. The result of fast roasting is that coffee processors can fill the traditional 16 ounce container with a much reduced weight of coffee that still results in an equivalent number of cups as 16 ounces resulting from a longer roasting process.

One approach to the more rapid roasting of coffee beans is disclosed in the U.S. patent of Brandlein et al., U.S. Pat. No. 4,737,376. As disclosed therein, the beans have a residence time within the roaster for a period of much less than three minutes and perhaps less than 1.5 minutes. During roasting, the beans are subjected to a flow of heated gas which passes upwardly through a first foraminated container at a mass flow rate of at least ten pounds of gas per pound of beans. In that process, the depth of the expanded bed is less than 50% of the diameter of the container. Further apparatus for the fluidized bed roasting of coffee is disclosed in the U.S. patent of Sivetz, U.S. Pat. No. 3,964,175. The Sivetz disclosure also contains a survey of prior art fluid bed roasters.

A more recent approach for obtaining a rapid uniform roast is disclosed in our copending U.S. patent application, Ser. No. 07/463,557, which was filed on Jan. 11, 1990, now U.S. Pat. No. 5,068,979 entitled "Apparatus and Process for Conditioning Particulate Material" and which is incorporated herein in its entirety by reference.

In essence, our earlier invention comprises a chamber for receiving a charge of coffee beans. The chamber has a generally circular base and an upwardly extending divergent wall defining a segment of a cone with a central axis and closed bottom. The divergent chamber wall preferably forms an included angle with respect to a horizontal plane of between 40° to 85° and also defines a plurality of openings in a lower portion thereof. Means are provided for inducing a mass of heated fluid generally tangentially into the chamber to rotate the coffee beans about the central axis of the chamber and for maintaining the rotating material in a relatively densely packed or controlled state during the heating thereof. During the rotation of the coffee beans, the chamber is stationary, i.e., it does not rotate about its central axis, so that there is relative movement between the rotating material and the stationary chamber. In addition, there is also vertical and radial movement of the coffee beans with respect to the chamber. There is also horizontal shearing within the spinning bed caused by beans near the bottom of the chamber moving faster relative to the beans near the top of the chamber.

Coffee roasters in accordance with our earlier invention uniformly roast batches of coffee very rapidly with an efficient use of energy. They also provide conditioning, cooling, heating and roasting apparatus which are relatively flexible, competitively priced, relatively simple in operation, free of complexity and easy to operate and maintain. In addition, such roasters occupy a relatively small area and can be rapidly converted to operate under different conditions in a job shop type of operation while fulfilling most of the requirements for food processing. Such roasters are referred to hereinafter as controlled spinning bed roasters or spinning bed roasters and are distinguished from fluid bed roasters even though both use a heated fluid such as air for transferring heat to the beans.

The commercial roasting of coffee beans generates a relatively large amount of chaff and other debris during the roasting process. This chaff and other debris becomes entrained in the heating medium, i.e., hot gas, and is typically carried downstream from the roaster to a separate cyclone separator. There are several problems associated with this approach. For example, the mixture of hot gas and chaff is flammable and, as the chaff is further reduced in size as it is transferred to the separator, may form an explosive mixture. In addition, because the separator is located downstream from the roaster, ducting and fittings are required to connect the two. This ducting increases the internal surface area that is exposed to the hot gas and chaff and subsequently becomes fouled with condensed smoke and chaff particles. If this fouling is allowed to build up, a fire hazard is created. Hence, periodic removal is required and is typically accomplished by burning out the roaster, i.e., bringing the entire loop up to a high temperature (perhaps 750° F.) and holding until all deposits are reduced to ash. The larger surfaces, such as the roaster to separator ducting and separate cyclone surfaces, require more energy to overcome losses to the environment, both during roasting and burnout, even though the ducts are insulated. Further, a torturous path through elbows tends to amplify local deposits. Associated with the increased ducting is also an increased internal volume of the roaster loop. As smoke is generated during the roasting process, the greater the volume of smoke retained in the loop, the greater the destructive energy should the smoke ignite and cause an explosion.

It has now been found that an improved apparatus in accordance with the present invention overcomes many of the problems associated with the prior art devices. For example, it is now believed that the improved apparatus disclosed and claimed herein minimizes the likelihood of fire and/or explosion by reducing surface area for fouling and decreasing internal volume, lowers energy requirements by minimizing surface area exposed to the ambient environment, facilitates the handling and removal of chaff from the hot gas, reduces space requirements because roaster and separator are now integrated, results in a simpler design, saves floor space and lowers machine cost because a separate cyclone with its attendant support structure, extra duct work, extra insulation and thermal expansion joints between it and the roaster are eliminated.

SUMMARY OF THE INVENTION

In essence, the present invention contemplates an apparatus for roasting coffee or the like which includes a chamber for receiving a charge of coffee beans. The apparatus also includes means for generating a flow of heated fluid and introducing the flow of heated fluid into the chamber for roasting the coffee beans within the chamber and with relative movement of the beans with respect to the chamber. In other words, the coffee beans are subjected to the heated fluid flow which form either a fluid bed or a controlled spinning bed of beans and roasting the same. Means are also provided for removing the roasted beans from the chamber. The invention also contemplates the addition of a centrifugal separator having a generally vertical axis disposed above and abutting the chamber and means for rotating the heated fluid as it moves upwardly out of the chamber and into and through the separator. Finally, the invention contemplates means for separately removing a major portion of the heated fluid which is relatively free of chaff and other debris and a smaller portion of the heated fluid with the chaff and other debris concentrated therein.

A preferred embodiment of the invention includes the combination of a controlled spinning bed roaster having a generally vertical axis and a centrifugal separator disposed above and abutting said chamber. The separator, which includes a conical wall and a base with an opening adjacent to and abutting the top of the spinning bed roaster, is axially aligned with the roaster. Thus, the separator receives the heated fluid mass and any chaff entrained therein as it is exhausted from the roaster. Means communicating with the opening in the base of the separator rotate the heated fluid mass as it moves upwardly into and through the separator. The separator also includes exit means in an upper portion thereof for separately removing a major portion of the fluid mass which is relatively free of chaff and a smaller portion of the fluid mass with essentially all of the chaff entrained therein from the separator. The combination also includes means for removing the roasted beans from the spinning bed roaster.

A further embodiment of the invention is directed to a centrifugal or cyclone separator for use with fluid bed coffee roasters and controlled spinning bed roasters. The separator comprises a generally cylindrical body having an inner wall and an annular opening at the top and bottom thereof. Means communicating with and preferably within the opening at the bottom of the cylindrical body are adapted to receive an upward flow of heated gas and entrained debris and for imparting sufficient rotational movement to the flow so that the cylindrical forces imparted on the debris will move the debris outwardly against the inner wall and upwardly toward the top of the cylindrical body. The cyclone separator also includes first exhaust means, i.e., the opening in the top of the cylindrical body for exhausting a major portion of the flow of gas which is relatively free of debris. A second exhaust means is also included in an upper portion of the cylindrical body next to or adjacent the inner wall for removing a minor portion of the gas and essentially all of the chaff and other debris. The chaff and gas are then separated by means of a standard cyclone, settling chamber or filter and the gas is returned to a point of lower pressure in the systems to be recycled.

BRIEF DESCRIPTION OF THE DRAWINGS

The invention will now be described in connection with the accompanying drawings, in which.

DETAILED DESCRIPTION OF THE PREFERRED EMBODIMENTS OF THE INVENTION

Figure 1:
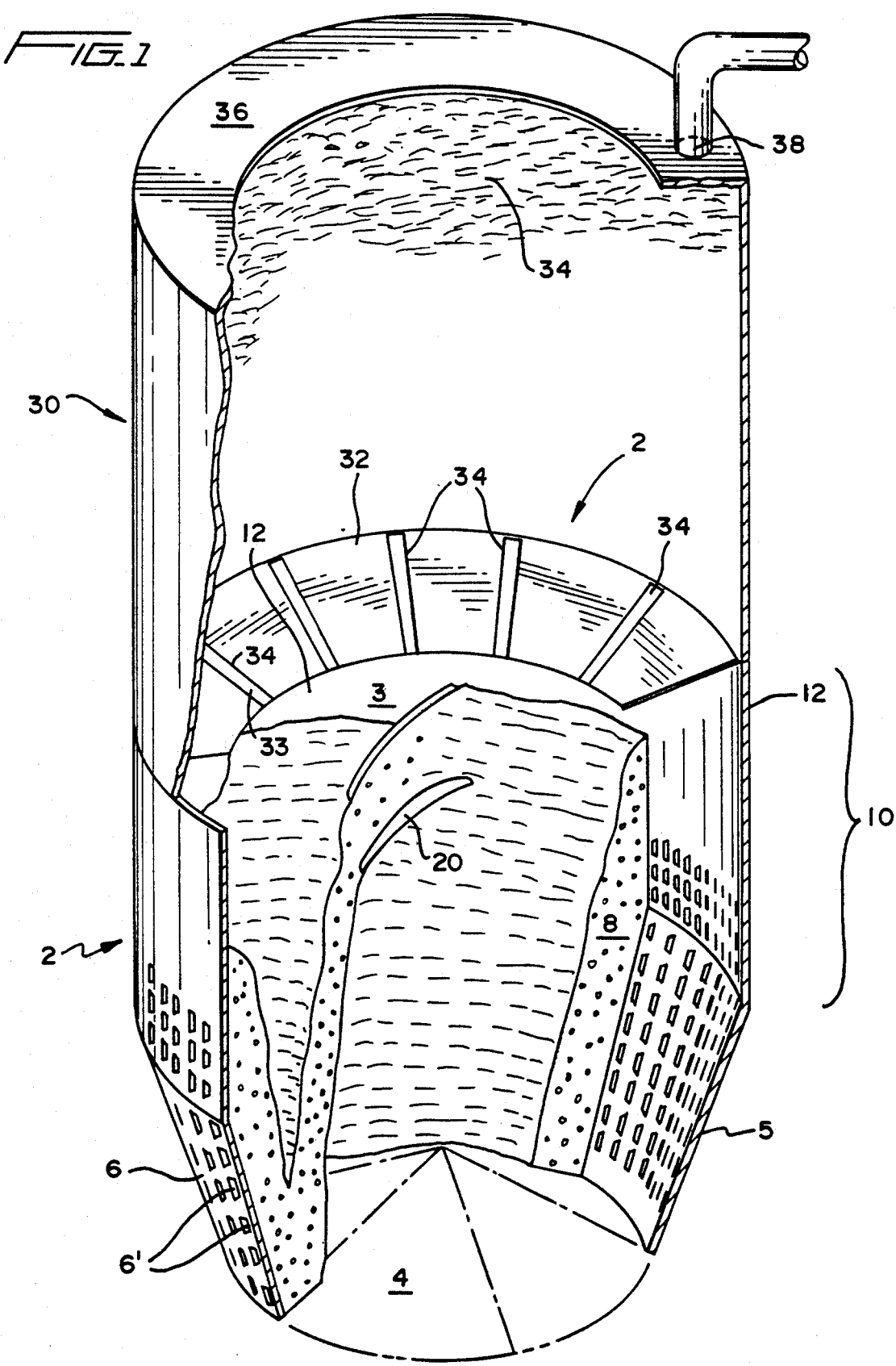
FIG. 1 is a partially broken away perspective view of a roasting chamber having a controlled spinning bed of particulate material therein and an axially aligned abutting separator as an integral part thereof.

An apparatus for roasting coffee beans or the like, according to the invention, will now be described in connection with the accompanying drawings wherein like reference numerals have been used to designate like parts.

In accordance with a first embodiment of the invention, a coffee roaster 2 comprises a generally upright chamber 3 (FIGS. 1 and 2) which is adapted to receive a charge of coffee beans. The chamber 3 has a generally circular base 4 and an upwardly extending divergent wall 5 which defines a segment of a cone with a central axis (not shown). The circular base 4 may, as illustrated, define a relatively shallow cone which extends upwardly into the chamber so that any coffee beans falling thereon will flow outwardly toward the upwardly extending wall 5 of chamber 3.

A lower portion of chamber 3 also defines a plurality of openings 6 or preferably louvers 6' which are adapted to receive a mass of air. For example, heated air is induced tangentially into the chamber 3 through the opening 6 to form and maintain a spinning controlled bed of beans 8 as illustrated in FIG. 1.

The chamber 3 also includes an upper portion 10 which is coaxial with the lower portion and which includes an upwardly extending wall 12. This upwardly extending wall 12 may define a right circular cylinder or a conical section wherein the slope of wall 12 is greater than the slope of wall 5.

The purpose of the upper portion 10 is to stop the upward climb of the beans along the wall 5. The beans in the bed will preferably move spirally upwardly along the wall 5 because of the centrifugal force component on the bed. For example, the forces working on a single bean in the bed 8 is rotated about the central axis of the chamber 3 by means of tangentially induced air and is subjected to a centrifugal force component which forces the bean outwardly toward the wall 5. The weight of the bean produces a vertical component. Thus, there is a resultant force, which is due to the gravity and centrifugal acceleration. This resultant force should be approximately normal to the wall 5 or have a slightly upward component which will force the bean within the spinning bed to climb upwardly along a spiral path along wall 5. Thus, the forces acting on the beans in bed 8 cause the beans to climb the cone-shaped chamber and form a free surface which is approximately parallel to the wall 5.

Thus, the purpose of the air is two-fold. First, the air imparts sufficient velocity to the beans to maintain the spinning bed; and, second, provides heat transfer to the beans. In practice, the air spins the beans about the central axis fast enough so that the centrifugal force component is several times that of gravity. This apparent weight increase is important for heat transfer and permits a substantial amount of air to pass through the bed without levitating the beans. In fact, the result is a relatively stable spinning bed in which the beans follow a relatively defined path, remain in a relatively dense bed with a flow of gas through the bed and with controlled mixing which provides a uniform roast so that each of the beans in the bed experience essentially the same heat history.

The high velocity heated air enters the chamber 3 generally tangentially through the opening 6, past louver 6' and passes through the bed 8. For example, air which is preheated to 550° to 650° F. (287° to 343° C.) enters the chamber 3 through opening 6 at, for example, approximately 100 to 125 feet per second while the beans are travelling at approximately 10 feet (3.05 meters) per second. As a result, there is a high relative scrubbing in the layer of beans next to the chamber and a very high film coefficient of heat transfer. Also, as the air transfers its momentum to the beans, it slows and follows a generally curved path through the bed and exits in a direction which is approximately normal to the inner surface of the bed 8. At that point, its velocity has decreased to about 10 feet (3.05 meters) per second which is insufficient to uplift or levitate the beans. Suitable means such as a plurality of nozzles (not shown) direct the air toward the louvers 6' or openings 6 so that the air enters the chamber in a mostly tangential direction.

Once established, the bed will remain in essentially dynamic equilibrium with a minimal amount of recirculation as the beans in the outer portion of the bed spiral upwardly and those on the inner portion spiral downwardly. Thus, a stable spinning bed as described above can be established and maintained by selecting the slope of the chamber wall, diameter of the chamber and air velocity. For example, with a larger load of coffee beans, the beans in the inner free surface will be subjected to the effects of gravity more so than those at the outer edge of the bed, i.e., closest to the chamber wall.

To accommodate different loads and obtain uniform roasting during a relatively short roasting cycle, it is desirable to increase the mixing of the beans within the bed. For this reason, it is desirable to add separate mixing means to mechanically turn and mix the bed. A bean spill 20 which is partially broken away in FIG. 1 illustrates the movement of the beans within bed 8. The bean spill 20 is formed of a curved metallic plate which curves downwardly and preferably inwardly to define a surface which is characteristic of a two-dimensional sheet which has been twisted.

A centrifugal cyclone separator 30 comprises a generally cylindrical wall 12' which may be an extension of wall 12. In a preferred embodiment of the invention, the separator 30 is axially aligned with roaster 2. The separator 30 also includes a conically shaped plate 32 at the bottom thereof, i.e., between the roaster 2 and separator 30. The separator 30 would preferably be conical to aid in moving the chaff to the top (or bottom) take out point. The cylindrical chamber, as illustrated, requires more air velocity than a conical chamber to move all of the chaff to the top. An inverted cone with bottom chaff take out point could also be used as will be described hereinafter. The conically shaped plate 32 includes a plurality of relatively large elongated openings 33 and louvers 34 for redirecting the upwardly flowing hot gasses and imparting rotational movement thereto as illustrated by the arrow in FIG. 3.

The cross sectional area of openings 33 should be at least equal to and preferably greater than the combined area of openings 6 in order to maintain a relatively small pressure drop in the heating medium or hot gas and entrained chaff as they enter the separator. Also the gas is cooled and its velocity reduced as it passes through the packed bed which leads to a reduced pressure drop. It is desirable to maintain a small pressure drop because the chaff is relatively light and the centrifugal force required to move the chaff outwardly against wall 12' and upwardly therealong is relatively small. The pressure drop should also be maintained at a low level since it is advantageous to handle the chaff gently, i.e., to move the chaff with a minimal velocity in order to avoid breaking the relatively fragile chaff into smaller particles. Smaller particles are more difficult to collect and could contribute to a potentially explosive mixture.

The separator 30 also includes a partial cover 36 extending around the top of wall 12' and defining a central aperture or opening 37 so that a major portion of the heated fluid medium or hot gas which is relatively free of chaff can be exhausted therethrough. The partial cover 36 also includes second exhaust means such as an opening 38 and pipe 40 adjacent to wall 12' for exhausting a relatively small portion of hot gas with a majority of the chaff entrained therein.

There are a number of advantages in locating the separator 30 immediately above the roaster 2 or as an integral part thereof. Since the separator 30 captures the chaff almost immediately upon discharge through louvers 34, piping, elbows and other transitions are eliminated. Elimination of these elements reduces chaff particle degradation and thus improves the efficiency of the chaff collection process. Elimination of piping, turns, lengthy runs and free standing components also reduces the cost of the overall system and improves the thermal efficiency of the roaster by eliminating heat loss in exposed pipe surface areas.

The compact design of this embodiment of the invention also reduces the enclosed volume of the recirculation loop and thus reduces the total amount of smoke which is available to fuel an explosion. For this reason, it is presently believed that the potential for an explosion will be reduced. Combining the roaster and separator or collector in accordance with the present invention also reduces the total amount of pressure loss in the system which is beneficial in fan or blower sizing as well as the horse power requirements for the system.

The use of a compact design in the present embodiment of the invention reduces the surface area of pipes and elbows and thus minimizes the internal available areas for fouling and/or chaff accumulation. In particular, elimination of elbows reduces chaff deposits since eddy currents are generally present on the downstream side of elbows. It is within these low velocity eddys that chaff slugs normally build up. These slugs of chaff can be the source of a smoldering ember during operation of a roasting system. In addition, the close coupling of roaster 2 and separator 30 reduces thermal expansion stresses in the recirculation loop and the elimination of expensive thermal expansion joints. The compact design also reduces the amount of steel which is heated and cooled in each cycle and, therefore, contributes to a more efficient operation.

A cylindrical hopper 42 for holding a charge of green coffee beans 44 is disposed above separator 30 and is preferably axially aligned therewith. The hopper 42 may be supported by braces 43 or other suitable means and is connected to the roaster 2 by means of a central pipe 46 which passes through the separator 30 and the conical plate 32. A valve 42' is opened to drop the charge of green beans into the roaster and then closed so that the hopper 42 can be refilled during the roasting process.

It is presently believed that the central pipe passing through the center of the separator will have no adverse effect on the separator since the rotational direction of the hot gasses moves the chaff outwardly toward wall 12'.

The operation of the apparatus according to the presently preferred embodiment of the invention will be described in more detail in connection with FIG. 2. For example, approximately 50 pounds (22.7 kilos) of green coffee beans are loaded into a cylindrical hopper 42. This hopper 42 may be approximately 16 inches (40.64 cm) in diameter with a height of about 12 inches (30.48 cm) and includes a conical-shaped lower portion 42a which would, if extended to an apex, form an angle of about 90°. It is also desirable to have a closable opening and valve 42' at the bottom of about 5.5 inches (13.97 cm) in diameter so that the 50 pounds (22.7 kilos) of beans can be dumped through the central pipe 46 and into the roasting chamber 3 within about 3 seconds. In essence, it is desirable to charge the roaster as fast as possible to minimize dead time in between roasting. A roaster as described would, for example, have a capacity of about 700 to 1,000 pounds (317.5 to 453.6 kilos) of coffee per hour.

Figure 2:
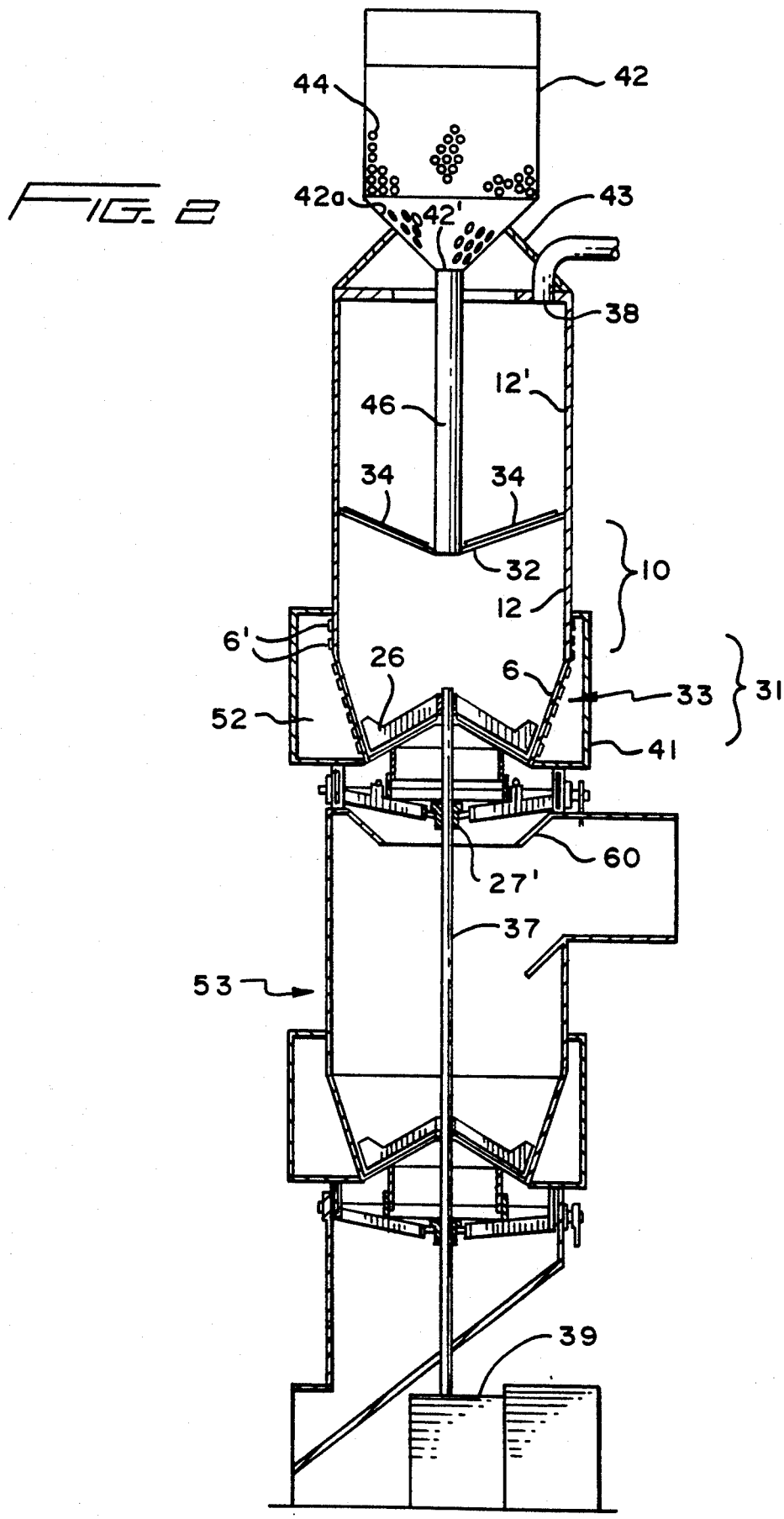
FIG. 2 is a cross-sectional view of a coffee roaster having an integral separator for chaff removal in accordance with a presently preferred embodiment of the invention.

As illustrated in FIG. 2, the roasting chamber 3 includes a lower section 33 which contains a plurality of louvers 6' and a cylindrical upper section 10 which is the same diameter as a cylindrical portion of lower section 33. This cylindrical upper section 10 may also include a plurality of openings 6 and louvers 6' in a lower portion thereof and may include a viewing port (not shown). The chamber 3 also includes means for exhausting air and/or hot gasses and the normal chaff produced during the roasting of the coffee through an upper portion thereof.

Figure 3:
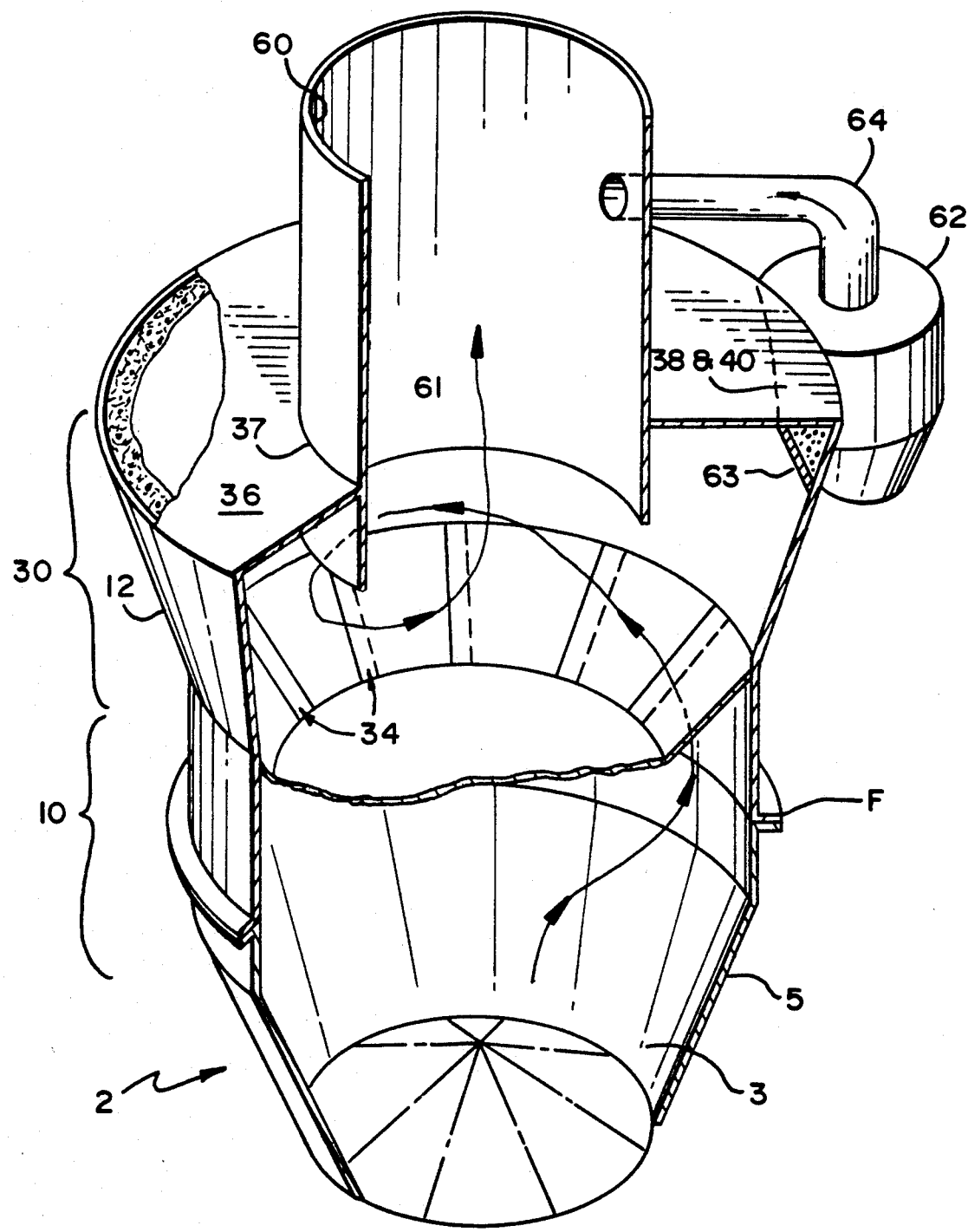
FIG. 3 is a partially broken away perspective view of a roaster-separator in accordance with a preferred embodiment of the invention.

For example, the air, hot gasses and chaff rise upwardly toward the top of the chamber 3 and are directed by the louvers 34 into the separator 30. The louvers 34 impart a rotational movement to the air, hot gasses and chaff as illustrated in FIG. 3. As the chaff moves outwardly against wall 12', it spirals upwardly through the separator 30 and a majority of the air and hot gasses are exhausted out of the separator 30 by passing through aperture 37.

The chaff, together with a relatively small portion of the air and hot gasses, is concentrated at the outside of separator 30 against wall 12' and is removed from separator 30 by means of opening 38 and pipe 40. The chaff is removed from the hot gasses in a small standard cyclone or similar device. The exhaust from this small cyclone is fed back into the system at a point where the system pressure is lower than aperture 38.

The lower section 31 of chamber 3 is surrounded by an inlet scroll or manifold 41 which directs the air in a direction which is generally or mostly tangentially toward the louvers in the lower section. The paddles 26 are rotated in the direction of the louvers by means of shaft 37 and motor drive assembly 39 to aid in the initial rotation of the beans and heated air at a temperature between 550°–650° F. is pumped into the manifold 41 and is directed toward the louvers 6' and into the interior of chamber 3 to form and maintain a stable controlled spinning bed of beans.

The manifold 41 may also be connected to a centrifugal blower or spiral impeller (not shown) and is constructed and arranged to direct a flow of heated air through the louvers 6' in the lower section in a mostly tangential direction to spin the coffee beans about a central and vertical axis. This tangentially directed air enters the chamber through, for example, 10 rows of 1 inch louvers with ¾ inch (1.9 cm) spacings and which are disposed with an upward angle of about 22°. It is presently believed that the upward angle aids in supporting the spinning bed without levitating the beans. The inlet scroll or spiral distributor is, in essence, the reverse of a spiral diffuser and is constructed and arranged so that the air is directed toward the louvers in a tangential direction and in a manner such that the inlet velocity is the same or approximately the same for each louver.

The lower section and chamber 3 in an upper part thereof, or in a lower part of upper portion 10, may also include three circumferential rows of louvers of about 0.67 inches equally spaced and angled downwardly at about 7°, 10° and 15°, respectively, from bottom to top. These rows of louvers are shown as disposed in a right circular cylindrical section and are thought to aid in limiting the amount of climb by the beans up the wall 5 of the chamber 3.

After roasting the beans for about 60 to 90 seconds, the conically-shaped base 4 is moved upwardly or downwardly in a manner which will be described in more detail hereinafter and the airflow into the chamber may be stopped.

The beans passing out of the roasting chamber 3 pass downwardly through a quench spray ring (not shown) and are preferably sprayed with cooling water to reduce their temperature, prevent further pyrolysis and increase the humidity within the coffee beans. The partially cooled beans then drop into a second chamber 53 which is disposed coaxially with and below chamber 3. The details of a improved bean spill are disclosed in our co-pending application entitled "Improved Apparatus for Conditioning Particulate Material" filed on even date herewith and incorporated herein in its entirety by reference.

Chamber 53, may be equally dimensioned and is generally similar to chamber 3. However, chamber 53 is a cooling chamber which uses air at ambient temperature for cooling the beans. Thus, the dumping means for the second chamber 53 is also generally similar to that used for chamber 3, but does not usually but may incorporate a quenching spray for further cooling of the beans.

In designing an apparatus according to the present invention, there are a number of parameters to be considered which have been described in detail in our earlier application.

A presently preferred embodiment of the invention is illustrated in FIG. 3 wherein a roaster 2 including a generally upright chamber 3 having an upwardly extending divergent wall 5 as previously described. The cyclone separator 30 as shown in FIG. 3 is joined to the roaster 2 by means of a flange F. As illustrated, the separator 30 is formed as an extension of an upper portion 10 or welded thereto. In the preferred embodiment of the invention, separator 30 includes an upwardly extending divergent wall 12' and conically shaped plate 32 at the bottom thereof with a plurality of louvers or openings 33 to provide rotational movement to the upwardly moving flow of hot gas. In the preferred embodiment, the conically shaped plate is made up of a plurality of overlapping plates which form relatively large tangential louvers. The divergent or conical wall 12' is preferred since less velocity is needed to move the chaff up to the top of the separator 30 and to concentrate the chaff at the top for removal by scoop 63.

The separator 30 also includes a partial cover 36 around the top of wall 12' which defines a central opening 37. An outlet duct 60 extends through opening 37 and downwardly for a short distance into the separator 30 for exhausting the flow of hot gas which is relatively free of chaff. An arrow 61 indicates the general flow of gas. A second relatively small cyclone separator 62 is disposed adjacent separator 30 and constructed and arranged to receive the concentrated chaff by means of scoop 63. The separator 62 is of conventional design and separates the concentrated chaff from the relatively small amount of gas which is removed therewith. The chaff then drops out of the bottom of second separator 62 while the clean gas is returned to the system by means of a pipe 64.

Figure 4:
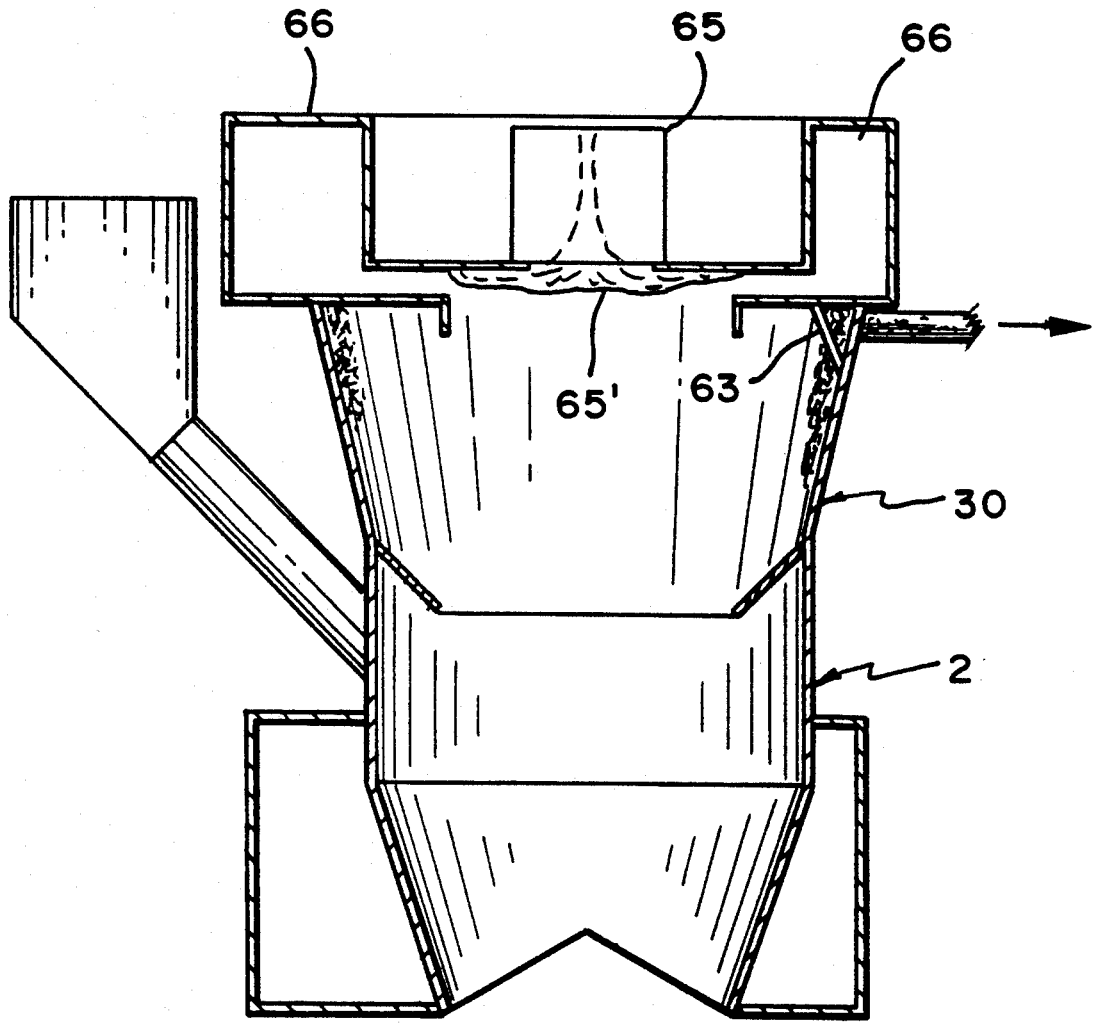
FIG. 4 is a side elevational view of a further embodiment of an invention which includes a radial flame burner above the separator.

FIG. 4 illustrates a further embodiment of the invention wherein a radial flame burner 65 is disposed immediately above the separator 30. As illustrated, a flame 65' heats the clean air which is returned via volutes 66 to a circulation fan (not shown). In this case, the bean hopper 42 is shifted off axis and feeds the coffee beans into one side of the roaster 2.

Figure 5:
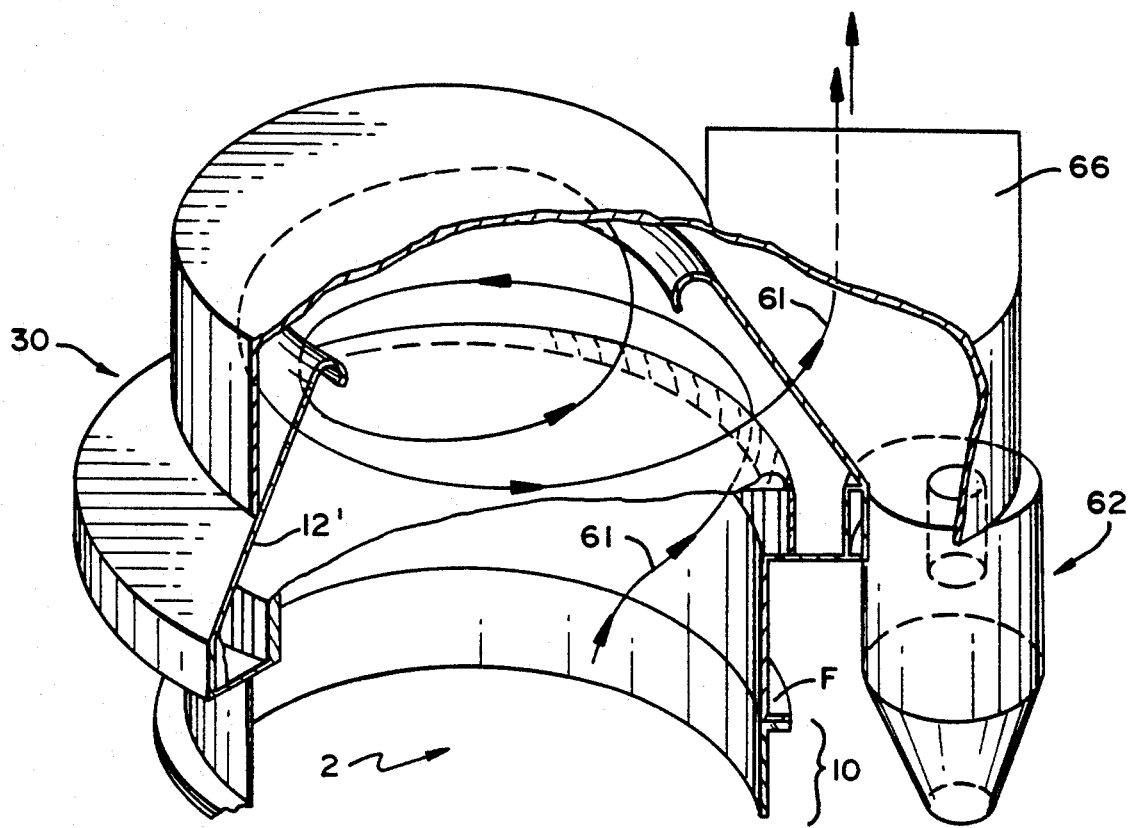
FIG. 5 is a partially broken away perspective illustrating another embodiment of the invention.

A further embodiment of the invention is illustrated in FIG. 5 which shows a roaster separator combination wherein the chaff is removed from a lower portion of the separator 30. In this case, the wall 12' of separator 30 diverges outwardly from the top to bottom to form an inverted cone with its longest radius at the base of the separator 30. The chaff is then fed to the second separator 62 through an inlet 62' so that the chaff will be dropped out of the bottom of the second separator 62 while the hot gas will be exhausted through the top thereof. As illustrated, the volute 66 exhausts the gas in a horizontal direction rather than vertically.

While the invention has been described in connection with several preferred embodiments, it should be understood that numerous modifications and changes may be made without departing from the scope of the appended claims.

What is claimed is:

1. Apparatus for roasting particulate vegetable material comprising a generally vertically disposed chamber for receiving a charge of particulate vegetable material, means for generating a flow of heated fluid and for introducing the flow of heated fluid into said chamber for roasting the particulate vegetable material within said chamber and with relative movement of the particulate vegetable material with respect to said chamber, a centrifugal separator disposed above and abutting said chamber, said centrifugal separator defined by a generally cylindrical wall and having a vertical axis which is in general axial aligment with said chamber, means for rotating the heated fluid as it moves upwardly out of said chamber and into and through said separator and for removing any chaff or residue from the heated fluid and means for removing the roasted particulate vegetable material from said chamber.

2. Apparatus for roasting particulate vegetable material according to claim 1, in which said centrifugal separator is integral with said chamber.

3. Apparatus for roasting particulate vegetable material according to claim 1, in which said separator includes upper and lower portions having a top and base with an opening therein respectively and in which said means for introducing a flow of heated fluid into said separator introduces the flow through said base and into said lower portion and in which said means for rotating the heated fluid mass comprises an element disposed in said opening in said base, said element having a plurality of fluid deflectors which are constructed and arranged to impart rotational movement to the fluid mass as it passes upwardly into and through said separator.

4. Apparatus for roasting particulate vegetable material according to claim 3, in which said element is a plate and said fluid deflectors are louvers within said plate.

5. Apparatus for roasting particulate vegetable material according to claim 3, which includes means defining a central opening in said top of said separator but removed from the wall of said separator for removing a major portion of the heated fluid mass which is relatively free of chaff and means defining a second opening in an upper portion of said separator for removing the chaff with a minor portion of the fluid mass.

6. Apparatus for roasting particulate vegetable material comprising a roasting chamber for receiving the particulate vegetable material, said chamber having a generally circular base and an upwardly extending divergent wall defining a segment of a cone with upper and lower portions, a central axis and a plurality of openings in said wall, means for heating a fluid mass, means for inducing the heated fluid mass generally tangentially into said chamber to rotate the vegetable material about the axis with relative movement with respect to said chamber and for maintaining the rotating vegetable material in a relatively densely packed state during the heating thereof, exit means in said upper portion of said chamber for allowing the heated fluid mass and any chaff produced during heating of the particulate vegetable material to leave the chamber, a centrifugal separator disposed above and abutting said chamber, said separator having a conical wall and a base which defines an opening adjacent to and abutting said exit means of said chamber for receiving the heated fluid mass and any chaff entrained therein, means for rotating the heated fluid mass as it moves upwardly into and through said separator, and exit means in an upper portion of said separator for separately removing a major portion of the fluid mass which is relatively free of chaff and a smaller portion of the fluid mass with chaff entrained therein from said separator and means for removing the material from said chamber.

7. Apparatus for roasting particulate vegetable material according to claim 6, in which means for rotating the heated fluid mass as it moves upwardly into and through said separator comprises a plate having a plurality of openings and adjacent louvers therein which are disposed at the base of said separator and which is constructed and arranged to impart rotational movement to the fluid mass as it passes therethrough.

8. Apparatus for roasting particulate vegetable material according to claim 7 in which the cross-sectional area defined by the openings in said plate are greater than the cross-sectional area defined by the openings in said wall of said chamber so that the velocity of fluid flow in said separator is substantially less than the velocity of fluid flow in said chamber.

9. Apparatus for roasting particulate vegetable material according to claim 8 in which said centrifugal separator is axially aligned with said chamber.

10. Apparatus for roasting particulate vegetable material according to claim 9 in which said centrifugal separator is formed as an integral part of said chamber.

11. Apparatus for roasting particulate vegetable material according to claim 10, in which said exit means in said separator defines a central opening in the top of said separator inwardly from the wall thereof for removing a majority of said heated fluid mass which is relatively free of chaff and a second opening in said upper portion of said separator for removing the chaff and a minor portion of the heated fluid mass.

12. Apparatus for roasting particulate vegetable material according to claim 11 which includes a hopper for holding a charge of particulate vegetable material, said hopper disposed above said separator and pipe means passing through a center portion of said separator for delivering a charge of vegetable material to said roasting chamber and valve means disposed between said hopper and said roasting chamber for opening and closing and said pipe means.

13. Apparatus for roasting particulate vegetable material according to claim 6 in which said means for inducing the heated fluid mass generally tangentially into said chamber causes a first pressure drop and in which said means for rotating the heated fluid mass as it moves upwardly into and through said separator causes a second pressure drop which is less than the first pressure drop so that any chaff entrained in the heated fluid mass is moved relatively gently through said separator.

* * * * *